United States Patent [19]
Van Bost

[11] Patent Number: 5,864,490
[45] Date of Patent: Jan. 26, 1999

[54] RETRACTABLE ELECTRONIC PEN PAD ASSEMBLY FOR A KEYBOARD

[76] Inventor: Thomas A. Van Bost, 76 Kerri-Lynn Rd., Warwick, R.I. 02886

[21] Appl. No.: 906,118

[22] Filed: Jul. 25, 1997

[51] Int. Cl.$^6$ ........................................ G06F 1/16
[52] U.S. Cl. ................... 364/708.1; 364/709.13; 345/905; 361/686
[58] Field of Search ............... 364/708.1, 709.13; 345/905, 173; 361/680, 683, 686

[56] References Cited

U.S. PATENT DOCUMENTS

| | | | |
|---|---|---|---|
| 5,173,686 | 12/1992 | Fujihara | 345/905 |
| 5,231,380 | 7/1993 | Logan | 361/680 |
| 5,339,213 | 8/1994 | O'Callaghan | 361/683 |
| 5,396,400 | 3/1995 | Register et al. | 361/686 |
| 5,440,502 | 8/1995 | Register | 361/686 |
| 5,483,262 | 1/1996 | Izutani | 345/905 |

*Primary Examiner*—David H. Malzahn

[57] ABSTRACT

A retractable electronic pen pad for a keypad is provided including a keyboard having a plurality of alphanumeric keys adapted to generate character signals upon the depression thereof. Further included is a sliding bracket coupled to a bottom face of the keyboard. An electronic pen pad is slidably coupled to the sliding bracket with a retracted orientation wherein the pen pad resides below the bottom face of the keyboard and an extended orientation with the pen pad extending from the periphery of the keyboard. During use, the pen pad is adapted to transmit an image signal corresponding to an image such as a signature formed by the depression of the top surface of the pad.

7 Claims, 2 Drawing Sheets

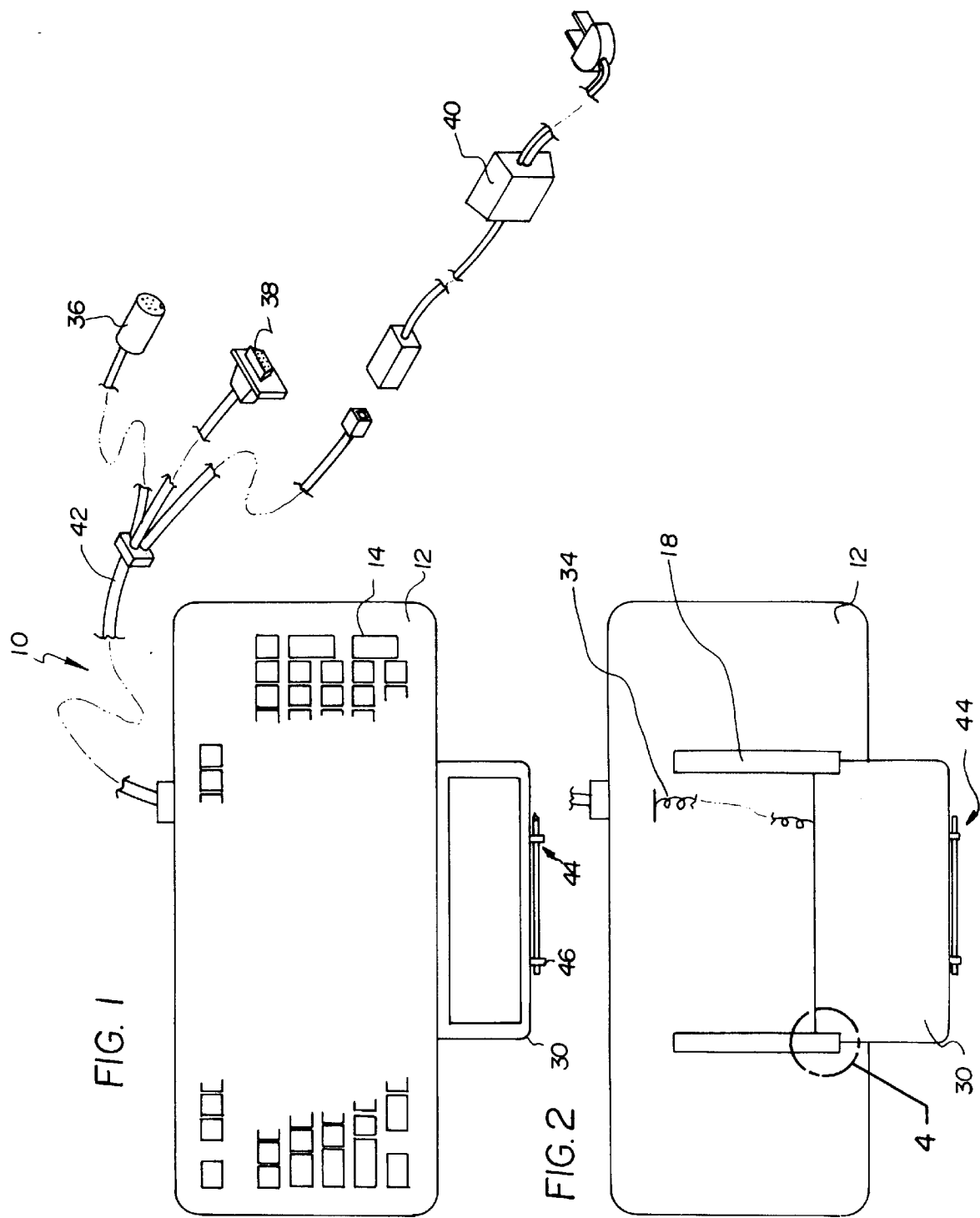

RETRACTABLE ELECTRONIC PEN PAD ASSEMBLY FOR A KEYBOARD

BACKGROUND OF THE INVENTION

1. Field of the Invention

The present invention relates to electronic pen pads and more particularly pertains to a new retractable electronic pen pad assembly for a keyboard for conveniently entering a signature or image during word processing or a business transaction on the computer.

2. Description of the Prior Art

The use of electronic pen pads is known in the prior art. More specifically, electronic pen pads heretofore devised and utilized are known to consist basically of familiar, expected and obvious structural configurations, notwithstanding the myriad of designs encompassed by the crowded prior art which have been developed for the fulfillment of countless objectives and requirements.

Known prior art electronic pen pads include U.S. Pat. No. 5,408,077; U.S. Pat. No. 5,278,399; U.S. Pat. No. 5,375,226; U.S. Pat. Des. 348,875; and U.S. Pat. No. 5,181,029.

In these respects, the retractable electronic pen pad assembly for a keyboard according to the present invention substantially departs from the conventional concepts and designs of the prior art, and in so doing provides an apparatus primarily developed for the purpose of conveniently entering a signature or image during word processing or a business transaction on the computer.

SUMMARY OF THE INVENTION

In view of the foregoing disadvantages inherent in the known types of electronic pen pads now present in the prior art, the present invention provides a new retractable electronic pen pad assembly for a keyboard construction wherein the same can be utilized for conveniently entering a signature or image during word processing or a business transaction on the computer.

The general purpose of the present invention, which will be described subsequently in greater detail, is to provide a new retractable electronic pen pad assembly for a keyboard apparatus and method which has many of the advantages of the electronic pen pads mentioned heretofore and many novel features that result in a new retractable electronic pen pad assembly for a keyboard which is not anticipated, rendered obvious, suggested, or even implied by any of the prior art electronic pen pads, either alone or in any combination thereof.

To attain this, the present invention generally comprises a keyboard including a top face, a bottom face, and a periphery formed therebetween. Such periphery defines a front edge, a rear edge, and a pair of side edges. As is convention, the top face has a plurality of alphanumeric keys each adapted to generate a character signal upon the depression thereof. As best shown in FIGS. 2-4, a sliding bracket includes a pair of guide members. Each of the guide members has a lower rectangular strip and an upper rectangular strip situated atop the lower rectangular strip with a thin interconnection member integrally coupled therebetween. Note FIG. 3. Such interconnection member is coupled along one of the long edges of an upper surface and a lower surface of the lower rectangular strip and upper rectangular strip of each guide member, respectively. As such, the upper and lower rectangular strips of each guide member thus define a slot. For reasons that will become apparent hereinafter, an edge of the interconnection member of each guide member situated within the slot has a stop integrally coupled to an end thereof and protruded inwardly therefrom. As shown in FIG. 2, the guide members of the sliding bracket have the upper rectangular strips thereof coupled to the bottom face of the keyboard. Such guide members are situated in parallel relationship with each other and adjacent and perpendicular with respect to the front edge of the keyboard. It is imperative that the guide members are oriented such that the stops thereof are located next to the front edge of the keyboard. Also included is an electronic pen pad having a planar rectangular configuration with a top surface, a bottom surface, a rear edge, a front edge, and a pair of side edges. The side edges of the pen pad have a pair of tabs extending therefrom in coplanar relationship with the pad and adjacent the rear edge thereof. In use, the side edges of the electronic pen pad are adapted to be slidably situated within the slots of the sliding bracket. As such, the pen pad has a retracted orientation wherein the pen pad resides below the bottom face of the keyboard and an extended orientation with the pen pad extending from the front edge of the keyboard. In the extended orientation, the tabs of the pen pad engage the stops of the sliding bracket. The pen pad further has a coiled cable connected between a rear edge of the pen pad and a bottom surface of the keyboard adjacent the rear edge thereof. During operation, the pen pad is adapted to transmit an image signal via the cable corresponding to an image formed by the depression of the top surface of the pad. Also included is a pen mounting assembly. Such assembly includes a pair of prongs extending from the front edge of the pen pad and has a pair of axially aligned bores formed therein. For use with the electronic pen pad is a pen with an elongated cylindrical configuration. The pen is completely formed of a plastic material and has an end with a sharpened tip. By this structure, the pen is adapted to be releasably situated within the bores of the mounting assembly. During use of the present invention, the pen is employed to depress an image in the pad.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable electronic pen pad assembly for a keyboard apparatus and method which has many of the advantages of the electronic pen pads mentioned heretofore and many novel features that result in a new retractable electronic pen pad assembly for a keyboard which is not anticipated, rendered obvious, suggested, or even implied by any of the prior art electronic pen pads, either alone or in any combination thereof.

It is another object of the present invention to provide a new retractable electronic pen pad assembly for a keyboard which may be easily and efficiently manufactured and marketed.

It is a further object of the present invention to provide a new retractable electronic pen pad assembly for a keyboard which is of a durable and reliable construction.

An even further object of the present invention is to provide a new retractable electronic pen pad assembly for a keyboard which is susceptible of a low cost of manufacture with regard to both materials and labor, and which accordingly is then susceptible of low prices of sale to the consuming public, thereby making such retractable electronic pen pad assembly for a keyboard economically available to the buying public.

Still yet another object of the present invention is to provide a new retractable electronic pen pad assembly for a keyboard which provides in the apparatuses and methods of the prior art some of the advantages thereof, while simultaneously overcoming some of the disadvantages normally associated therewith.

Still another object of the present invention is to provide a new retractable electronic pen pad assembly for a keyboard for conveniently entering a signature or image during a word processing or a business transaction on the computer.

Even still another object of the present invention is to provide a new retractable electronic pen pad assembly for a keyboard that includes a keyboard having a plurality of alphanumeric keys adapted to generate character signals upon the depression thereof. Further included is a sliding bracket coupled to a bottom face of the keyboard. An electronic pen pad is slidably coupled to the sliding bracket with a retracted orientation wherein the pen pad resides below the bottom face of the keyboard and an extended orientation with the pen pad extending from the periphery of the keyboard. During use, the pen pad is adapted to transmit an image signal corresponding to an image such as a signature formed by the depression of the top surface of the pad.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of the present invention.

FIG. 2 is a bottom view of the present invention.

DESCRIPTION OF THE PREFERRED EMBODIMENT

Figure 3:
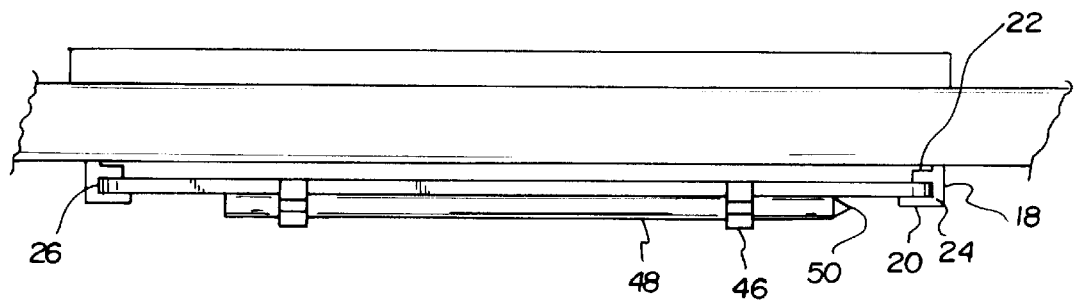
FIG. 3 is a front view of the present invention.

With reference now to the drawings, and in particular to FIGS. 1 through 4 thereof, a new retractable electronic pen pad assembly for a keyboard embodying the principles and concepts of the present invention and generally designated by the reference numeral 10 will be described.

As shown in FIG. 1, a keyboard 12 is provided including a top face, a bottom face, and a periphery formed therebetween. Such periphery defines a front edge, a rear edge, and a pair of side edges. As is convention, the top face has a plurality of alphanumeric keys 14 each adapted to generate a character signal upon the depression thereof.

Figure 4:
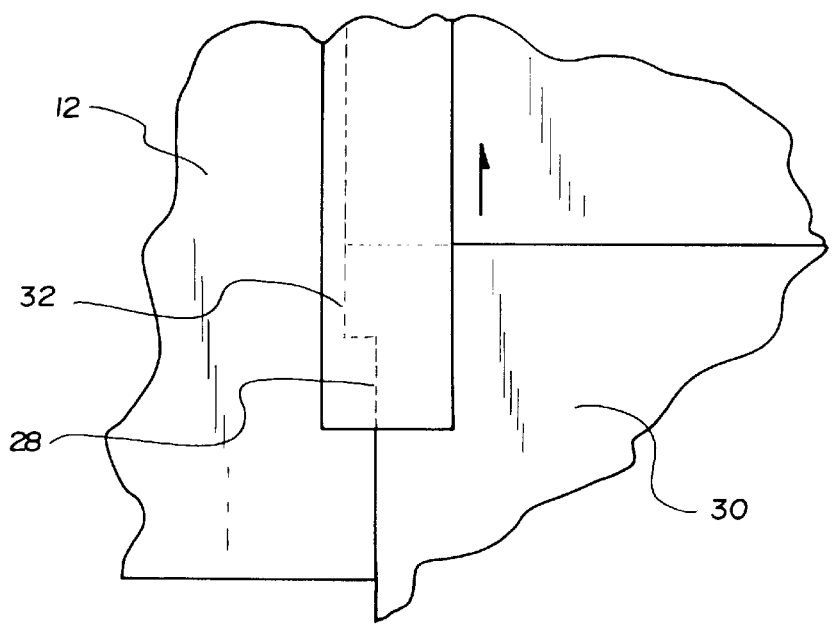
FIG. 4 is a close up view of one of the stops and tabs of the sliding bracket assembly and pen pad of the present invention, respectively.

As best shown in FIGS. 2–4, a sliding bracket includes a pair of guide members 18. Each of the guide members has a lower rectangular strip 20 and an upper rectangular strip 22 situated atop the lower rectangular strip with a thin interconnection member 24 integrally coupled therebetween. As shown in FIG. 3, the lower rectangular strip has a width of about twice that of the upper rectangular strip. Such interconnection member is integrally coupled along one of the long edges of an upper surface and a lower surface of the lower rectangular strip and upper rectangular strip of each guide member, respectively.

As such, the upper and lower rectangular strips of each guide member thus define a slot 26. For reasons that will become apparent hereinafter, an edge of the interconnection member of each guide member situated within the slot has a stop 28 integrally coupled to an end thereof and extended inwardly therefrom.

As shown in FIG. 2, the upper rectangular strips of the guide members of the sliding bracket are coupled to the bottom face of the keyboard. Such guide members are situated in parallel relationship with each other and adjacent and perpendicular with respect to the front edge of the keyboard. It is imperative that the guide members are oriented such that the stops thereof are located next to the front edge of the keyboard.

Also included is an electronic pen pad 30 having a planar rectangular configuration with a top surface, a bottom surface, a rear edge, a front edge, and a pair of side edges. The side edges of the pen pad have a pair of tabs 32 extending therefrom in coplanar relationship with the pad and adjacent the rear edge thereof. In use, the side edges of the electronic pen pad are adapted to be slidably situated within the slots of the sliding bracket.

As such, the pen pad has a retracted orientation wherein the pen pad resides below the bottom face of the keyboard and an extended orientation with the pen pad extending from the front edge of the keyboard. In the extended orientation, the tabs of the pen pad engage the stops of the sliding bracket. The pen pad is thus ideally situated for use when in the extended orientation thereof.

The pen pad further has a coiled cable 34 connected between a rear edge of the pen pad and a bottom surface of the key board adjacent the rear edge thereof for communicating signals therewith. During operation, the pen pad is adapted to transmit an image signal via the cable corresponding to an image formed by the depression of the top surface of the pad. Such image preferably takes the form of a signature of the like.

It should be noted that upon the generation of the image signal or any one of the character signals, the keyboard is adapted to relay the same to an associated computer. Such is preferably accomplished by way of a DIN connector 36 for transmitting the character signals and a DB9 RS232 serial port connector 38 for transmitting the image signals. Upon the receipt of such signals, the computer is preferably adapted to include the image signals with various applications such as word processing and Internet use. Software is employed to accomplish this. It should be noted present invention is specifically designed for use with software that permits the real time input of the image signals.

For providing power to the electronic pen pad, a DC power supply 40 is preferably connected thereto via the coiled cable. In order to prevent cluttering of the various wires associated with each of the connectors and the power supply, each of the same are preferably bundled in a sleeve 42 which extends from an aperture formed in the rear edge of the keyboard and extended therefrom a predetermined distanced. At a termination of the sleeve, the various wires are free to be connected to the respective ports and outlets.

Also included is a pen mounting assembly 44. Such assembly includes a pair of spaced prongs 46 extending from the front edge of the pen pad. The prongs are equipped with a pair of axially aligned bores.

For use with the electronic pen pad, a pen 48 is provided with an elongated cylindrical configuration. The pen is completely formed of a plastic material and has an end with a sharpened tip 50. By this structure, the pen is adapted to be releasably situated within the bores of the mounting assembly. During use of the present invention, the pen is employed to depress an image in the pad.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable electronic pen pad system comprising, in combination:

a keyboard including a top face, a bottom face, and a periphery formed therebetween defining a front edge, a rear edge, and a pair of side edges, the top face having a plurality of alphanumeric keys each adapted to generate a character signal upon the depression thereof;

a sliding bracket including a pair of guide members each having a lower rectangular strip and an upper rectangular strip situated atop the lower rectangular strip with a thin interconnection member integrally coupled therebetween along one of the long edges of an upper surface and an lower surface of the lower rectangular strip and upper rectangular strip of each guide member, respectively, the upper and lower rectangular strips of each guide member thereby defining a slot, an edge of the interconnection member of each guide member situated within the slot having a stop integrally coupled to an end thereof and protruding inwardly therefrom;

said guide members of the sliding bracket having the upper rectangular strips thereof coupled to the bottom face of the keyboard in parallel relationship with each other and adjacent and perpendicular with respect to the front edge of the keyboard with the stops located next to the front edge of the keyboard;

an electronic pen pad having a planar rectangular configuration with a top surface, a bottom surface, a rear edge, a front edge, and a pair of side edges, the side edges of the pen pad having a pair of tabs extending therefrom in coplanar relationship with the pad and adjacent the rear edge thereof, the side edges of the electronic pen pad adapted to be slidably situated within the slots of the sliding bracket with a retracted orientation wherein the pen pad resides below the bottom face of the keyboard and an extended orientation with the pen pad extending from the front edge of the keyboard with the tabs of the pen pad engaging the stops of the sliding bracket, the pen pad further having a coiled cable connected between a rear edge of the pen pad and a bottom surface of the key board adjacent the rear edge thereof, whereby the pen pad is adapted to transmit an image signal via the cable corresponding to an image formed by the depression of the top surface of the pad;

a pen mounting assembly including a pair of prongs extending from the front edge of the pen pad and having a pair of axially aligned bores formed therein; and a pen with an elongated cylindrical configuration having an end with a sharpened tip, the pen adapted to be removably situated within the bores of the mounting assembly, whereby the pen may be employed to depress an image in the pad.

2. A retractable electronic pen pad system comprising:

a keyboard including a top face, a bottom face, and a periphery formed therebetween defining a front edge, a rear edge, and a pair of side edges, the top face having a plurality of alphanumeric keys each adapted to generate a character signal upon the depression thereof;

a sliding bracket coupled to the bottom face of the keyboard;

an electronic pen pad slidably coupled to the sliding bracket with a retracted orientation wherein the pen pad resides below the bottom face of the keyboard and an extended orientation with the pen pad extending from the periphery of the keyboard, whereby the pen pad is adapted to transmit an image signal corresponding to an image formed by the depression of a top surface of the pen pad; and a pen mounting assembly coupled to the pen pad for allowing a pen to be releasably coupled thereto, wherein the mounting assembly includes a pair of prongs extending from a front edge of the pen pad in coplanar relationship therewith, the prongs being equipped with a pair of axially aligned bores formed therein.

3. A retractable electronic pen pad system as set forth in claim 2 wherein the sliding bracket has at least one stop for preventing the removal of the pen pad therefrom in the extended orientation.

4. A retractable electronic pen pad system as set forth in claim 2 wherein the pen pad extends from the front edge of the keyboard in a horizontal orientation in the extended orientation.

5. A retractable electronic pen pad system as set forth in claim 2 wherein a coiled cable is connected between a rear edge of the pen pad and a bottom surface of the keyboard for transmitting the image signal.

6. A retractable electronic pen pad system as set forth in claim 2 wherein the sliding bracket includes a pair of guide members each having a lower rectangular strip and an upper rectangular strip situated atop the lower rectangular strip with a thin interconnection member integrally coupled therebetween along one of the long edges of an upper surface and an lower surface of the lower rectangular strip and upper rectangular strip of each guide member, respectively, the upper and lower rectangular strips of each guide member thereby defining a slot, whereby said guide members of the sliding bracket have the upper rectangular strips thereof coupled to the bottom face of the keyboard in parallel relationship with each other and adjacent and perpendicular with respect to the front edge of the keyboard.

7. A retractable electronic pen pad system comprising:

a support;

a sliding bracket coupled to the support; and an electronic pen pad slidably coupled to the sliding bracket with a retracted orientation wherein the pen pad resides adjacent the support and an extended orientation with the pen pad extending from the support, whereby the pen pad is adapted to transmit an image signal corresponding to an image formed by the depression of a top surface of the pad; and a pen mounting assembly coupled to the pen pad for allowing a pen to be releasably coupled thereto, wherein the mounting assembly includes a pair of prongs extending from a front edge of the pen pad in coplanar relationship therewith, the prongs being equipped with a pair of axially aligned bores formed therein.

\* \* \* \* \*